United States Patent [19]
Katayama et al.

[11] Patent Number: 5,937,105
[45] Date of Patent: *Aug. 10, 1999

[54] IMAGE PROCESSING METHOD AND APPARATUS

[75] Inventors: Akihiro Katayama, Yokosuka; Koichiro Tanaka, Tokyo; Takahiro Oshino, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/009,187

[22] Filed: Jan. 20, 1998

Related U.S. Application Data

[63] Continuation of application No. 08/426,846, Apr. 24, 1995, abandoned.

[30] Foreign Application Priority Data

Apr. 25, 1994 [JP] Japan .................................. 6-086495

[51] Int. Cl.$^6$ ...................................... G06K 9/36
[52] U.S. Cl. ............................................. 382/293
[58] Field of Search ................................. 382/298, 293, 382/294, 295, 154, 255, 312, 300

[56] References Cited

U.S. PATENT DOCUMENTS

| | | | |
|---|---|---|---|
| 5,193,124 | 3/1993 | Subbarao ................................ | 382/255 |
| 5,249,035 | 9/1993 | Yamanaka .............................. | 382/145 |
| 5,528,194 | 6/1996 | Ohtani et al. ........................... | 382/293 |
| 5,577,130 | 11/1996 | Wu ........................................ | 382/106 |

FOREIGN PATENT DOCUMENTS 2244621  12/1991  United Kingdom .

OTHER PUBLICATIONS

"Generation of Intermediate Paralax=images for Holographic Stereograms", S. Takahashi, et al., Practical Holography VII: Imaging and Materials, San Jose, CA, USA, Feb. 1–2, 1993, vol. 1914, Proceedings of the SPIE—The International Society for Optical Engineering.

"A viewpoint Dependent Stereoscopic Display Using Interpolation of Multi–viewpoint Images", Katayama, et al., Stereoscopic Displays and Virtual Reality Systems II, San Jose, CA, USA, Feb. 7–9, 1995, vol. 2409, Proceedings of the SPIE—the International Soceity for Optical Engineering.

"Generalizing Epipolar–plane Image Analysis For Non–orthogonal and Varying View Directions", Baker, et al., Image Understanding Workshop Proceedings, Los Angeles, CA, USA, Feb. 23–25, 1987, vol. II, pp. 843–848.

*Primary Examiner*—Yon J. Couso
*Attorney, Agent, or Firm*—Fitzpatrick, Cella, Harper & Scinto

[57] ABSTRACT

Images picked up by a plurality of cameras are corrected and projected on a single plane. The input images are converted to projected images on a reference projection plane in accordance with reference parameters and camera parameters. Then images of an area of $nx \times ny$ whose center is an intersection B that is a perpendicular from a center of a lens of a m-th camera on the reference projection plane are extracted from the projected images. By extracting the area as described above, there is obtained an image which can be assumed that optical axes of each camera intersects perpendicular to the reference projection plane and the optical axes are parallel to each other. Therefore, when an epipolar plane is constructed during an image interpolation process, corresponding points form a straight line on the epipolar plane, thus it becomes easier to detect the corresponding points.

23 Claims, 13 Drawing Sheets

FIG. 11 j-TH EPIPOLAR PLANE

|   | 1 | 2 | 3 | 4 | 5 | 6 | 7 | 8 | 9 | 10 | 11 | 12 | 13 | ... | nx |
|---|---|---|---|---|---|---|---|---|---|----|----|----|----|-----|----|
| 1 |   |   |   |   | a1 |   |   |   |   |   |   |   |   |  |  |
| 2 |   |   |   | a1 | a1 | b2 |   |   | c1 |   |   | c1 |   |  |  |
| 3 |   |   |   | a1 | b2 | c1 |   |   |   |   |   |   |   |  |  |
| 4 |   |   | c1 | a1 | b2 |   |   |   |   |   |   |   |   |  |  |

IMAGE PROCESSING METHOD AND APPARATUS

This application is a continuation of application Ser. No. 08/426,846 filed Apr. 24, 1995, now abandoned.

BACKGROUND OF THE INVENTION

The present invention relates to an image processing method and apparatus and, more particularly, to an image processing method and apparatus capable of correcting image data.

In a conventional method for finding corresponding points among a plurality of images, there is a method in which an epipolar plane is constructed and the corresponding points are detected on the epipolar plane. The epipolar plane is where an image is formed in such a manner that corresponding lines of a plurality of images are extracted and these lines are arranged side by side. More specifically, if a pixel of a n-th image at (i, j) is denoted by Pn(i, j), and a pixel in a m-th epipolar plane at (i, j) is denoted by Qm(i, j), then every pixel on the epipolar plane is expressed by Qm(i, j)=Pj(i, m). The method using the epipolar plane makes use of characteristics that, when a plurality of cameras, arranged at an equal interval, pick up an image of an object, the corresponding points in each picked-up image form a straight line on the epipolar plane. Thereby finding the corresponding points can be done by detecting the straight line.

However, according to the conventional example, if image sensing surfaces (CCD, for instance) of all the cameras are not on a single plane, the corresponding points do not form a straight line on the epipolar plane. In that case, there arises a problem in which the process to detect the corresponding points becomes very complicated.

Further, even though the image sensing surfaces of all the cameras are on a single plane, if the image sensing surfaces are rotated, the corresponding points do not form a straight line on the epipolar plane. Accordingly, it becomes difficult to detect the corresponding points.

The above-described problems can be solved by arranging the plurality of cameras so that their image sensing surfaces are on a single plane and that their scanning directions are parallel to each other. However, it is very difficult, in general, to arrange the plurality of cameras so as to satisfy the aforesaid conditions.

SUMMARY OF THE INVENTION

The present invention has been made in consideration of the above situation, and has as its object to provide an image processing method and apparatus capable of correcting and projecting images picked up by a plurality of cameras on a single plane.

It is another object of the present invention to provide an image processing method and apparatus capable of extracting desired portions of images projected on a single plane and outputting it.

It is still another object of the present invention to provide an image processing method and apparatus capable of extracting portions of images projected on the plane so that optical axes of cameras used for picking up the images of an object are parallel to each other.

According to the present invention, the foregoing object is attained by providing an image processing apparatus comprising: input means for inputting an image picked up by an image sensing surface of a camera; calculation means for calculating a conversion parameter representing relationship between pixel positions on the image sensing surface and on a reference plane when the image on the image sensing surface of the camera is projected on the reference plane; forming means for forming an image of an area extracted from the reference plane by using data of pixels, which correspond to the pixels on the image of the area according to the conversion parameter, on the image sensing surface; and output means for outputting the image formed by the forming means.

With the construction as described above, there are calculated the conversion parameters showing correspondence between pixel positions on the image sensing surface and on the reference plane when the image, picked up by a camera, on the image sensing surface is projected on the predetermined reference plane. By using the parameters, values at each pixel position in the portion extracted from the reference plane can be obtained from values at corresponding pixel positions on the image sensing surface. Accordingly, an image in an area on the reference plane can be formed. As described above, it is possible to correct an image on an image sensing surface of a camera and make an image on a predetermined reference plane.

According to an aspect of the present invention as described above, the calculation means calculates the conversion parameter representing correspondence between a coordinate system of the image sensing surface of the camera and a coordinate system of the reference plane on the basis of a reference parameter representing correspondence between a coordinate system of an object calculated in accordance with an image taking result of the object and the coordinate system of the reference plane, and a camera parameter representing correspondence between the coordinate system of the object and the coordinate system of the image sensing surface of the camera.

With the construction as described above, the conversion parameters are calculated on the basis of the camera parameters and the reference parameters. The camera parameters are calculated based the image pick-up result of the object, and show correspondence between the coordinate system of the object and the coordinate system of the image sensing surface, and the reference parameters show correspondence between the coordinate system of the object and the coordinate system of the reference plane. When a plurality of cameras are used, for example, by calculating the conversion parameters for each camera, it is possible to project images of an object on the predetermined reference plane.

Further, preferably, the reference plane is a desired plane represented by the coordinate system of the object. Since a desired plane can be designated as the reference plane, it is possible to designates a plane which suits a plurality of camera.

Further, preferably, the reference plane is a plane including the image sensing surface of a reference camera arranged at a desired image-taking position, further comprising reference parameter calculation means for calculating the reference parameter representing correspondence between the coordinate system of the image sensing surface of the reference camera and the coordinate system of the object on the basis of the image-taking result of the object by the reference camera before the calculation by the calculation means. By constructing as above, the reference plane is automatically set by setting a desired camera as a reference camera.

Further, preferably, the area extracted from the reference plane by the forming means is an area whose center is an intersection of a perpendicular from a center of a lens on the reference plane. Accordingly, when images picked up by a plurality of cameras are corrected, optical axes of corrected images can be made parallel to each other.

Further, preferably, the area extracted from the reference plane by the forming means is an area of one line necessary for forming an epipolar plane.

It is another object of the present invention to make it easier to detect corresponding points by forming an epipolar plane from a plurality of images corrected and projected on a single plane and detecting the corresponding points as a straight line.

It is still another object of the present invention to make it possible to generate images seen from different viewpoints from those of input images by generating new lines in the epipolar plane by interpolation on the basis of the arrangement of the detected corresponding points on the epipolar plane and by using the lines.

It is still another object of the present invention to make it possible to determine occurrence of occlusion in accordance with the arrangement of the corresponding points detected on the epipolar plane, thereby generate interpolated images of better precision.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 shows the j-th epipolar plane in which the corresponding points are obtained by a corresponding point search;

DETAILED DESCRIPTION OF THE PREFERRED EMBODIMENT

A preferred embodiment of the present invention will be described in detail in accordance with the accompanying drawings.

In this embodiment, an image processing apparatus capable of generating images seen from viewpoints different from those of a plurality of cameras on the basis of images, picked up by the plurality of cameras, by interpolation will be described. In the image processing apparatus according to the embodiment, images from each camera are corrected so as to be on a single plane, as a pre-processing step for generating the interpolation images.

Figure 1:
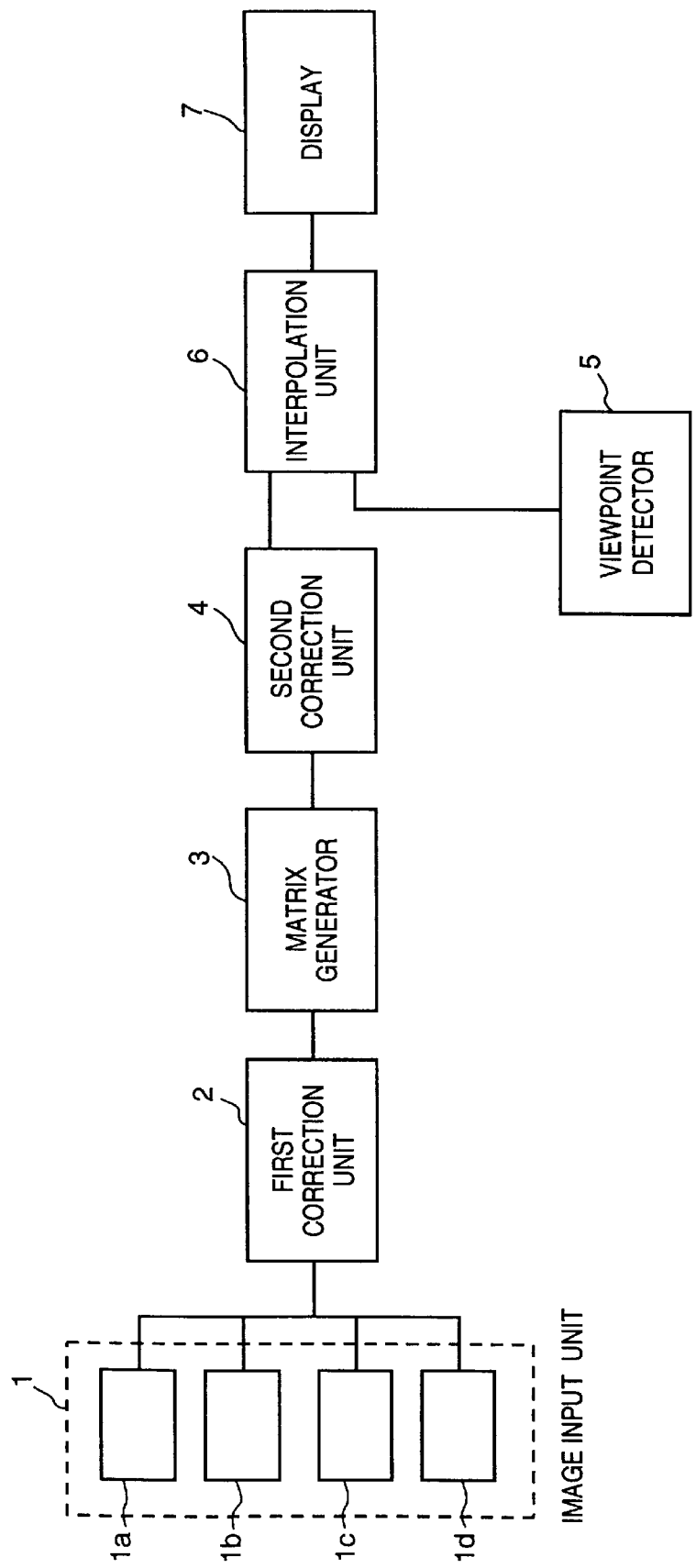
FIG. 1 is a block diagram illustrating a brief configuration of an image processing apparatus according to an embodiment.

FIG. 1 is a block diagram illustrating a brief configuration of the image processing apparatus according to the embodiment. In FIG. 1, reference numeral 1 denotes an image input unit for inputting an image, and it consists of four cameras, 1a to 1d, in this embodiment. Reference numeral 2 denotes a first correction unit for performing corrections, such as lens distortion correction, shading correction, color correction, and so on; 3, a matrix generator for generating a matrix used for correcting projection distortions caused by gaps in position and direction of the cameras; and 4, a second correction unit for correcting the projection distortions of an input image by using the matrix for correction generated by the matrix generator 3.

Further, reference numeral 5 denotes a viewpoint detector for detecting a viewpoint of an observer. The viewpoint detector 5 detects the viewpoint by using a magnetic sensor, an ultrasonic sensor, and the like. It should be noted that the method for detecting the viewpoint is not limited to those described above, as far as the viewpoint can be detected. For example, the viewpoint can be detected by detecting the position and direction of the observer's head. Reference numeral 6 denotes an interpolation unit which searches corresponding points by using images corrected by the second correction unit 4 and generates interpolation images. A display 7 switches and displays images which are applied with interpolation or projection distortion correction in accordance with the viewpoint detected by the viewpoint detector 5. Note that these processes are controlled by a CPU which is not shown.

Figure 2:
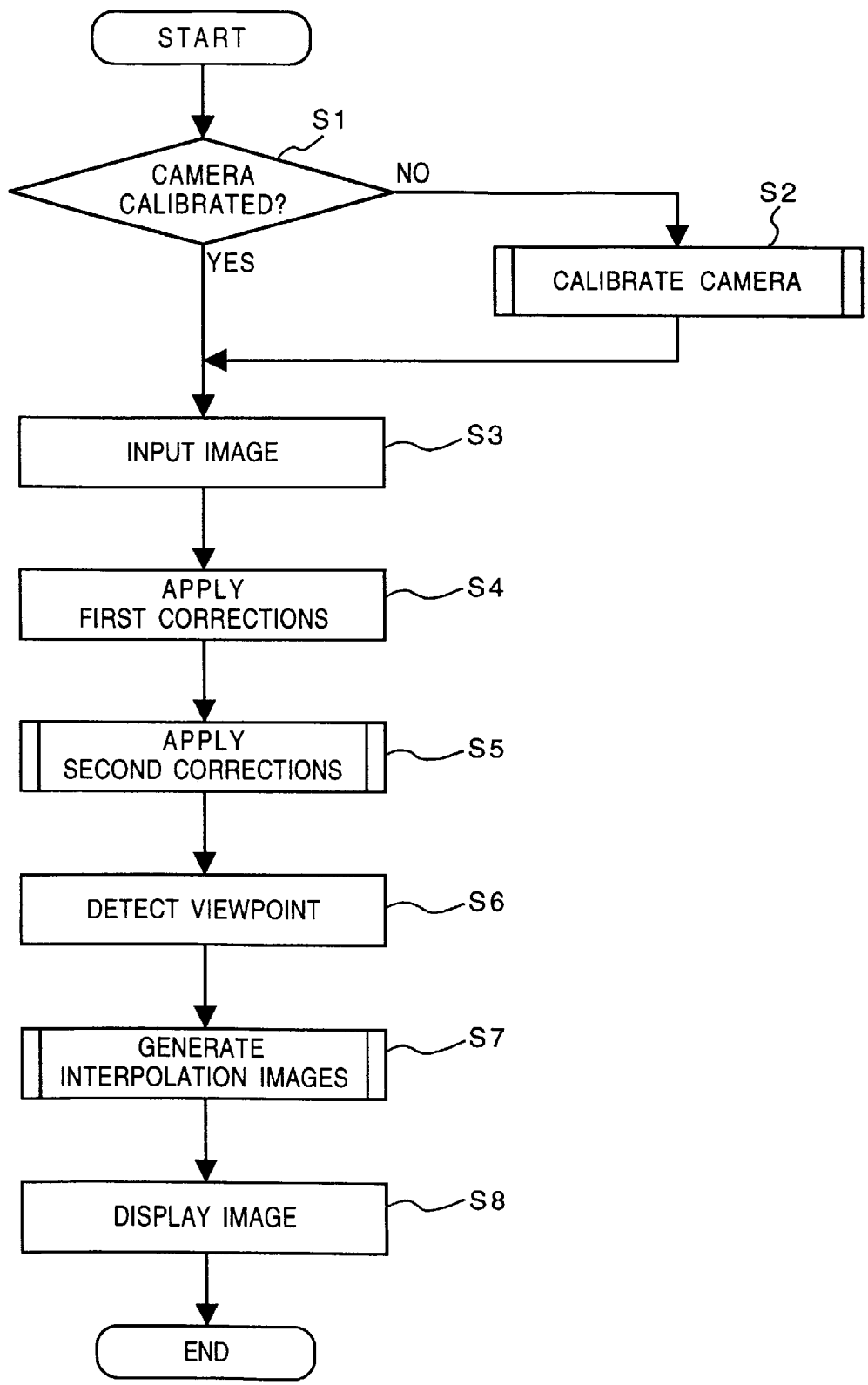
FIG. 2 is a flowchart showing a processing sequence of the image processing apparatus according to the embodiment.

Next, the flow of the entire processing of the image processing apparatus will be described. FIG. 2 is a flowchart showing a processing sequence of the image processing apparatus according to this embodiment.

First at step S1, a CPU determines whether or not a camera has been calibrated. More specifically, it is determined whether or not a matrix for correcting projection distortions has been generated is. If a camera has not been calibrated yet, the matrix generator 3 calibrates the camera at step S2, and generates a matrix for correcting projection distortions. When the camera has been calibrated, the process proceeds to step S3, and an image is inputted from the image input unit 1. Regarding the calibration of the camera at Step S2, it will be explained later with reference to a flowchart in FIG. 3.

The input image data is applied with first corrections, such as a lens distortion correction, shading correction, color correction, and the like, by the first correction unit 2 at step S4. After this, the process moves to step S5 where the image data is applied with second corrections by using the matrix for correcting projection distortions, obtained during calibrating the camera, by the second correction unit 4. The second correction is to correct each image inputted by each camera of the image inputting unit 1 by using the matrix for correcting projection distortions, thereby convert each image into an image on a predetermined reference plane, namely an image on a single surface. The second correction at step S5 will be described later referring to a flowchart in FIG. 4.

The process proceeds to step S6 where the viewpoint detector 5 detects a viewpoint of an observer. At step S7, the interpolation unit 6 generates interpolation images based on images corrected by the first and second correction units 2 and 4. In this case, images seen from viewpoints different from those of the inputted images picked up by the four cameras 1*a* to 1*d* are generated as the result of the interpolation process. The generation of images by the interpolation process will be described later with reference to FIGS. 6 to 14.

At step S8, image data is selected in accordance with the viewpoint of the observer detected at step S6 and sent to the display 7 where the image is displayed. In this embodiment, two proper images out of the input images and the interpolation images are treated as a pair of stereoscopic images, and the pair of images are displayed by switching alternatively at high speed. In this case, the observer can see a stereoscopic image by using shutter glasses which operate in synchronization with the alternating switching. If the images are polarized in the directions differing from each other when they are displayed by switching alternatively at high speed in the display 7, the observer can see a stereoscopic image by using a polarization glasses which operate in synchronization with the alternating switching of the images for the right and left eyes.

Next, the calibration of the camera at step S2 will be explained.

Figure 3:
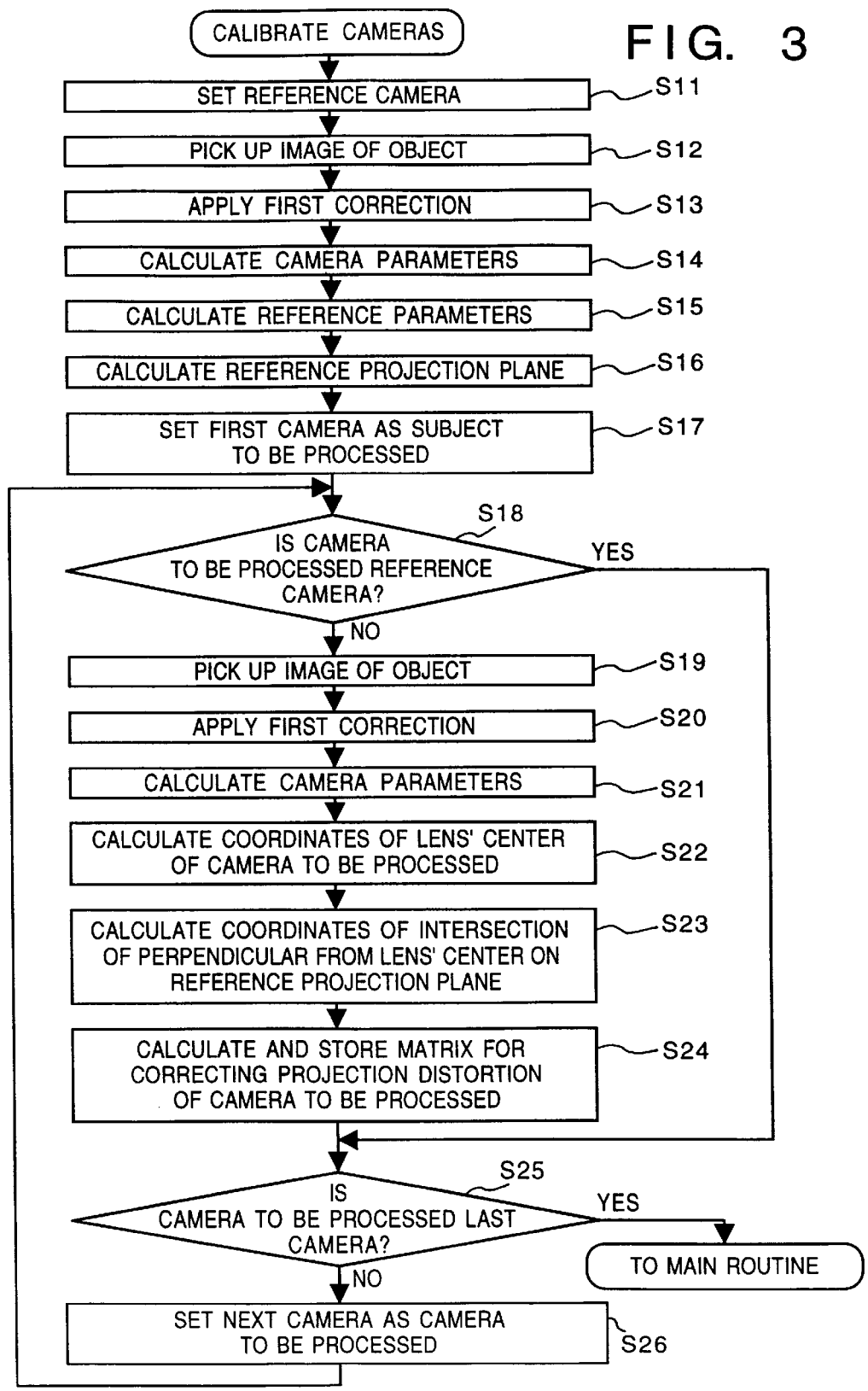
FIG. 3 is a flowchart showing a process of calibration of a camera.

FIG. 3 is a flowchart showing a calibration process of a camera performed at step S2. The projection distortions are caused since each image is originally sensed on a different plane. Accordingly, in order to correct the distortions, images from N (N=4, in this embodiment) input devices (cameras) need to be projected on a same plane. Here, one of the image sensing surface of the cameras is considered as a reference plane, and the camera whose image sensing surface is used as a reference plane is considered as a reference camera. Then, by projecting images obtained by the other cameras on the reference plane, images on a same plane can be obtained.

First at step S11, the reference camera which is the desired camera (camera 1*c*, for example) of the image inputting unit 1 is set as the camera to be processed. At step S12, the reference camera picks up an image of an object. Then at step S13, the image obtained at step S12 is applied with the first correction. The correction here is the same as the one described at step S4, thus omitting the explanation. Next at step S14, camera parameters which represent relationship between a coordinate system of the object (world coordinate system) and a coordinate system of the image sensing surface of cameras (camera coordinate system) are calculated.

As for calculating the camera parameters, a commonly known method for measuring a three dimensional image is used. More specifically, when the object is expressed in the world coordinate system (X, Y, Z) and the image sensing surface of each camera is expressed in the camera coordinate system ((xm, ym), m=1~4), the relationship between the world coordinate system and the camera coordinate system can be expressed by equation (1), $$\begin{pmatrix} Hm \cdot xm \\ Hm \cdot ym \\ Hm \end{pmatrix} = \begin{pmatrix} C_{m11} & C_{m12} & C_{m13} & C_{m14} \\ C_{m21} & C_{m22} & C_{m23} & C_{m24} \\ C_{m31} & C_{m32} & C_{m33} & C_{m34} \end{pmatrix} \begin{pmatrix} X \\ Y \\ Z \\ 1 \end{pmatrix} = Cm \begin{pmatrix} X \\ Y \\ Z \\ 1 \end{pmatrix} \quad (1)$$

Cm is a m-th camera parameter. The camera parameters can be found by using a least squares method as far as coordinates of six points at least in the world coordinate system and corresponding coordinates in the camera coordinate system are known. At step S15, these camera parameters of the reference camera are decomposed in accordance with following equation (2), $$\begin{pmatrix} C_{m11} & C_{m12} & C_{m13} & C_{m14} \\ C_{m21} & C_{m22} & C_{m23} & C_{m24} \\ C_{m31} & C_{m32} & C_{m33} & C_{m34} \end{pmatrix} = \quad (2)$$

$$\begin{pmatrix} 1 & 0 & 0 & 0 \\ 0 & 1 & 0 & 0 \\ 0 & 0 & 0 & 0 \\ 0 & 0 & \frac{1}{f} & 0 \end{pmatrix} \begin{pmatrix} T_{m11} & T_{m12} & T_{m13} & T_{m14} \\ T_{m21} & T_{m22} & T_{m23} & T_{m24} \\ T_{m31} & T_{m32} & T_{m33} & T_{m34} \\ 0 & 0 & 0 & 1 \end{pmatrix} =$$

$$\begin{pmatrix} 1 & 0 & 0 & 0 \\ 0 & 1 & 0 & 0 \\ 0 & 0 & 0 & 0 \\ 0 & 0 & \frac{1}{f} & 0 \end{pmatrix} Tm$$

A matrix Tm of the camera 1*c* which is obtained by decomposing in accordance with the equation (2) is stored as the standard parameter matrix Tb. It should be noted that any parameters having attached letter "b" have to do with the reference plane, hereinafter. The reference parameter matrix Tb is expressed by an equation (3), $$T_b = \begin{pmatrix} T_{b11} & T_{b12} & T_{b13} & T_{b14} \\ T_{b21} & T_{b22} & T_{b23} & T_{b24} \\ T_{b31} & T_{b32} & T_{b33} & T_{b34} \\ 0 & 0 & 0 & 1 \end{pmatrix} \quad (3)$$

If the camera parameters are known as described above, then the relationship between the world coordinate system and the camera coordinate system can be found. Accordingly, an equation for an image sensing surface of each camera in the world coordinate system is also found. The image sensing surface obtained as above is defined as the reference projection plane (step S16) After calculating the reference projection plane of the reference camera, the first camera becomes a subject to be processed at step S17, then a matrix for correcting projection distortions is generated at step S18 and follow.

At step S18, it is determined whether or not the camera which is the subject to be processed (referred as "camera to be processed", hereinafter) is the reference camera. If it is, since no correction is necessary, and the process moves to step S25. Whereas, if it is not, the process proceeds to step S19. At steps S19, S20 and S21, the same processes as at aforesaid steps S12, S13, and S14, respectively, are performed, then the process proceeds to step S22.

At step S22, coordinates of the center of the lens of the camera to be processed is calculated. The coordinates of the lens center in the world coordinate system can be calculated by using the least square method by using characteristics that the normalized camera parameters, obtained by normalizing the camera parameters, and a straight line passing through each points in the image sensing surface intersect at the lens center. After the coordinate of the lens center is found, the process proceeds to step S23 where coordinates of intersection of a perpendicular from the lens' center on the reference projection plane obtained at step S15 is calculated. The world coordinates of the intersection is denoted by (U, Vm, Wm). Further, the coordinates of the intersection in the camera coordinate system of the reference camera is denoted by (Xm, Ym), and stored. Note that this intersection is referred as "intersection B", hereinafter. In this case, relationship expressed by following equation (4) is established.

$$\begin{pmatrix} Hm \cdot Xm \\ Hm \cdot Ym \\ Hm \end{pmatrix} = \begin{pmatrix} C_{b11} & C_{b12} & C_{b13} & C_{b14} \\ C_{b21} & C_{b22} & C_{b23} & C_{b24} \\ C_{b31} & C_{b32} & C_{b33} & C_{b34} \end{pmatrix} \begin{pmatrix} Um \\ Vm \\ Wm \\ 1 \end{pmatrix} \quad (4)$$

Then, the process moves to step S24 where a matrix for correcting projection distortions of the camera to be processed is calculated and stored. A matrix, Km, for correction of a m-th camera can be expressed as Km=Cm·Tb$^{-1}$. After the obtained Km is stored, the process proceeds to step S25, and it is determined whether or not the camera to be processed is the last camera (in this embodiment, four cameras are considered, thus the last camera is the fourth camera) if it is the last camera, the process goes back to a main routine (FIG. 2), whereas if it is not, the camera which is the subject to be processed is changed to the next one at step S26, and the process goes back to step S18.

Next, the second correction process (the process at step S5) of correcting images inputted from each camera of the image input unit 1 by using the matrix for correcting projection distortions and of converting the images into images on a predetermined reference plane, namely to images on a single plane will be explained.

Figure 4:
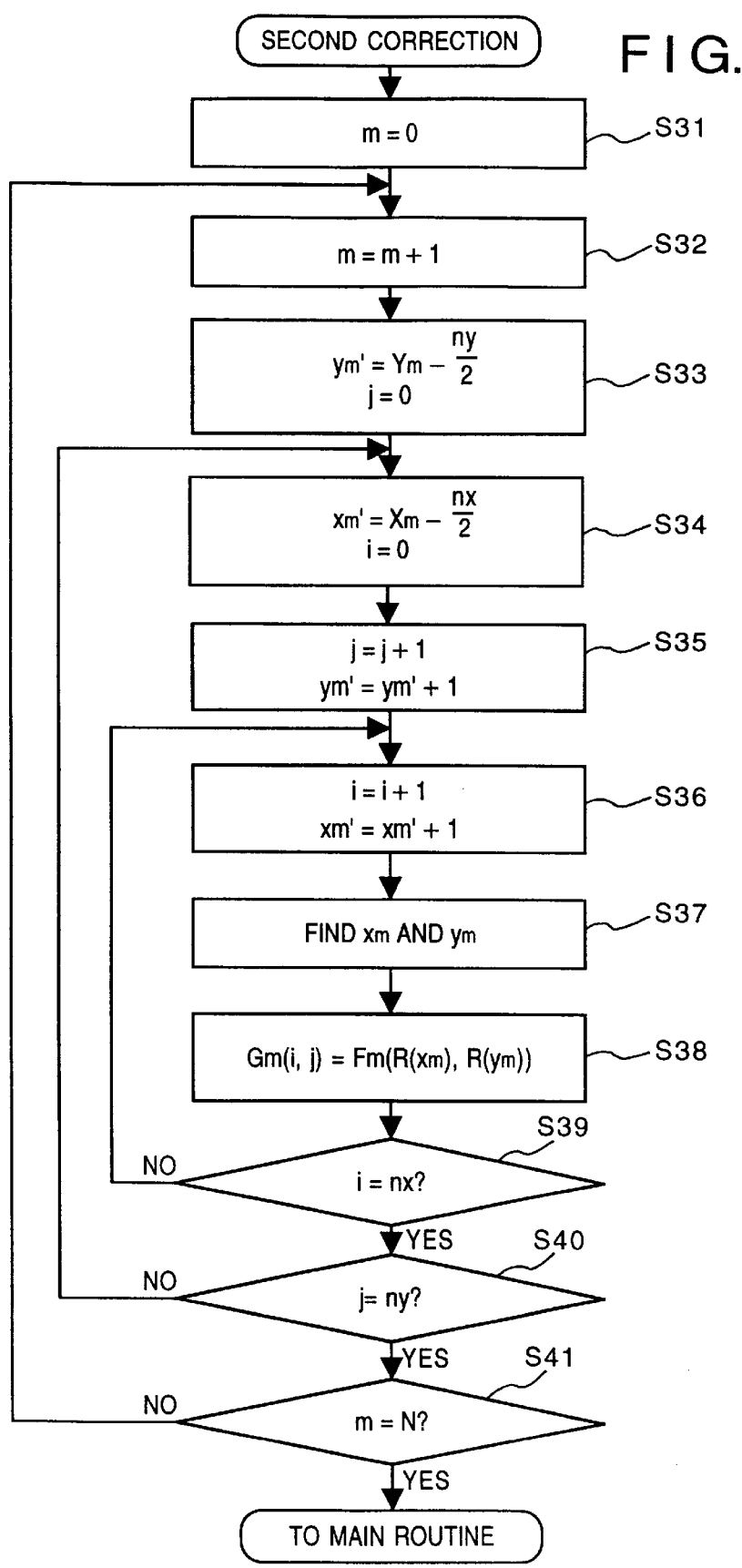
FIG. 4 is a flowchart showing a second correcting process.

FIG. 4 is a flowchart showing a flow of the second correction process. First at step S31, a variable m showing the ordinal number of camera is initialized. Next at step S32, m is incremented by 1. The process proceeds to step S33 where ym'=Ym−ny/2 and j=0 are set, and at step S34, xm'=Xm−nx/2 and i=0 are set. Here, Xm and Ym are x coordinate and y coordinate of the intersection B, respectively, obtained at step S23. Further, nx and ny are numbers of pixels in the x direction and y direction, respectively, of an image to be processed. Furthermore, xm', ym', i, and j are variables.

Figure 5:
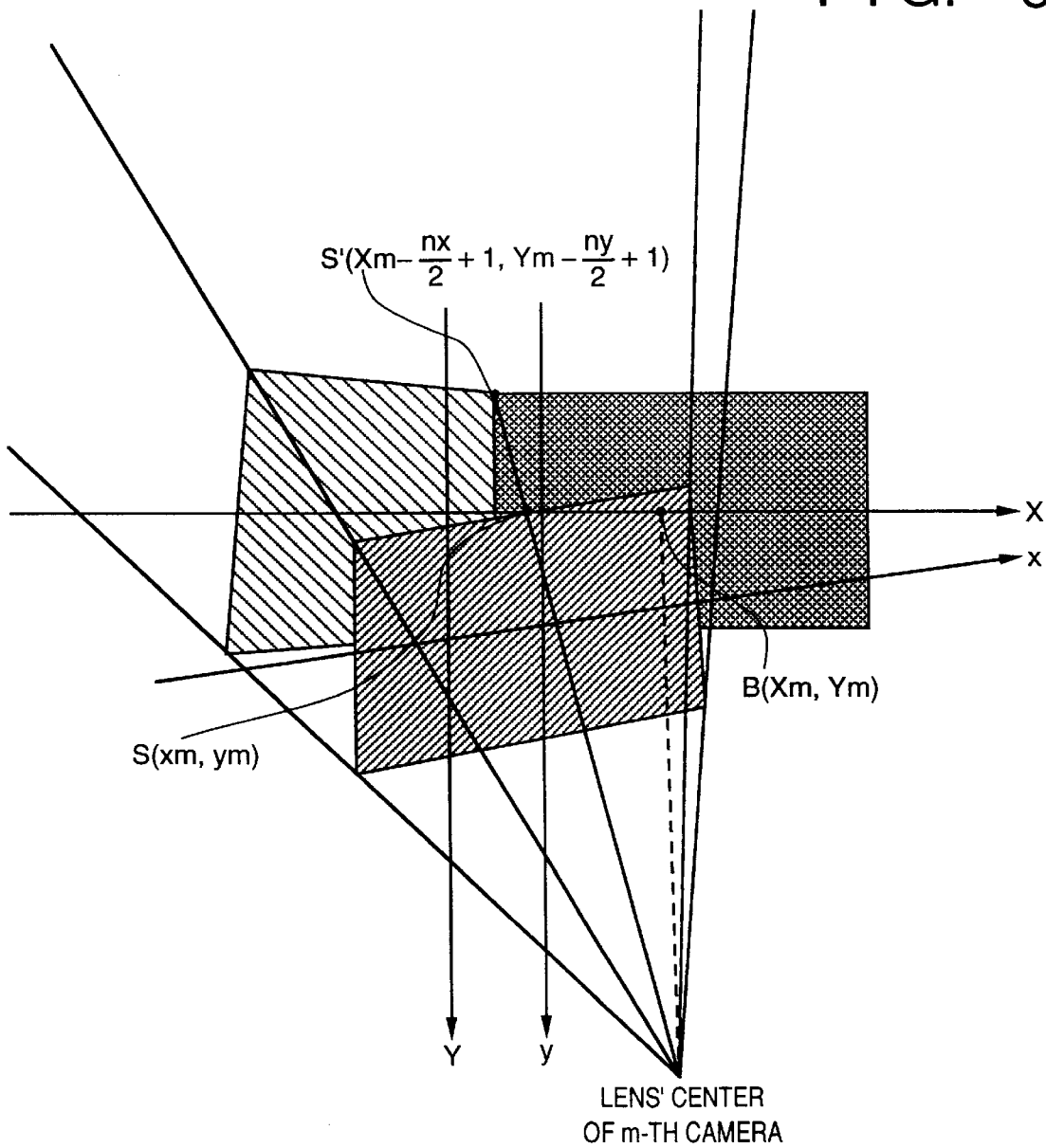
FIG. 5 is an explanatory view in which an image on an image sensing surface of a camera is projected on a reference plane.

FIG. 5 is an explanatory view in which an image of an image sensing surface of a camera is projected on the reference projection plane. In FIG. 5, the coordinate system of the reference plane is expressed by (X, Y), and the coordinate system of an input image is expressed by (x, y). By using the aforesaid matrices for correction, the input image can be projected on the reference projection plane as a projected image. In this embodiment, a desired corrected image is an image obtained by extracting an area of nx×ny including the intersection B, found at step S23, as its center from the reference projection plane. By extracting the area as above, there can be obtained an image taken by such cameras that optical axes of them are assumed to intersect perpendicular to the reference projection plane and to be parallel to each other. Accordingly, upon constructing an epipolar plane at the image interpolation process, the corresponding points forms a straight line in the epipolar plane, thereby it becomes easier to detect the corresponding points.

Further, at steps S33 and S34, the variables are set to one pixel prior to start point S', which is the start point for extracting an area from the reference projection plane, in the x and y directions, so that the variables matches to coordinates of the start point S' after the processes at steps S35 and S36 are performed.

At step S35, a pixel position of the image to be corrected is moved by one pixel at a time in the y direction by incrementing j and ym' by 1. Similarly, at step S36, a pixel position of the image to be corrected is moved by one pixel at a time in the x direction by incrementing i and xm' by 1. The process proceeds to step S37 where a pixel in the input image to which the coordinates (xm', ym,') in the corrected image correspond is found. The coordinates (xm', ym') can be obtained by solving following equation (5).

$$\begin{pmatrix} Hm \cdot xm \\ Hm \cdot ym \\ Hm \end{pmatrix} = \quad (5)$$

$$\begin{pmatrix} C_{m11} & C_{m12} & C_{m13} & C_{m14} \\ C_{m21} & C_{m22} & C_{m23} & C_{m24} \\ C_{m31} & C_{m32} & C_{m33} & C_{m34} \end{pmatrix} \begin{pmatrix} T_{b11} & T_{b12} & T_{b13} & T_{b14} \\ T_{b21} & T_{b22} & T_{b23} & T_{b24} \\ T_{b31} & T_{b32} & T_{b33} & T_{b34} \\ 0 & 0 & 0 & 1 \end{pmatrix} \begin{pmatrix} xm' \\ ym' \\ 0 \\ 1 \end{pmatrix}$$

After the coordinates (xm, ym) are found, a pixel value of the input image at the pixel position is calculated, and the calculated value substitutes a value of a pixel whose pixel position of the corrected image is expressed by (i, j). It should be noted that, at step S38, R(t) expresses an integer which is the closest to an arbitrary real value t. Further, Gm(i, j) and Fm(i, j) represent pixel values whose pixel positions are at (i, j) in the corrected image and the input image, respectively. After Gm(i, j) is calculated, the process moves to step S39 where it is determined whether or not i=nx. If i=nx, then the process proceeds to step S40, whereas if not, goes back to step S36. At step S40, whether or not j=ny is determined. If j=ny, then the process moves to step S41, whereas if not, goes back to step S34.

By performing aforesaid processes at steps 34 to 40, the corrected image in the area of nx×ny centered by the intersection B in the reference plane is obtained. After the extraction of the area has been completed, the process proceeds to step S41 where it is determined whether or not m=N. If all the corrections on images from all the cameras are completed, namely m=N, the process goes back to the main routine in FIG. 2. On the other hand, if there is any unprocessed image, the process goes back to step S32.

The corrected image generated as described above is a projected image on a single plane (reference plane), thus it can be considered that the optical axes of the cameras are parallel to each other. Therefore, if optical axes of each camera are not parallel to each other in practice, or if rotations, or the like, of each camera are slightly different from each other, it is possible to correct projection distortions of the images.

Next, generation of interpolation images by the interpolation unit 6 will be described.

Figure 6:
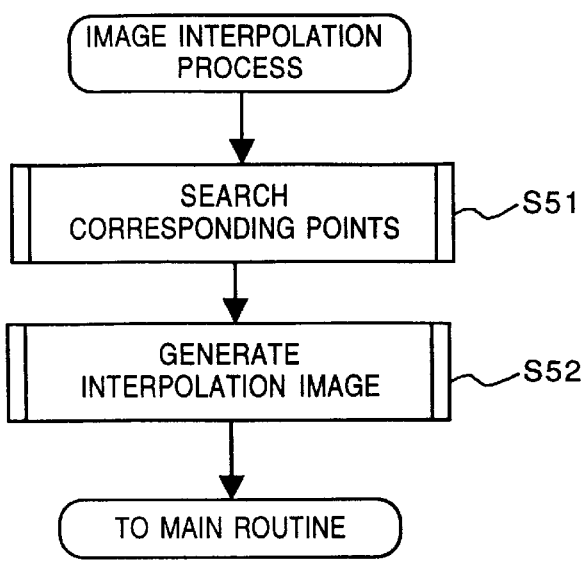
FIG. 6 is a flowchart showing an image interpolation process.

FIG. 6 is a flowchart showing a flow of the interpolation process. First at step S51, corresponding points are searched.

At step S52, an image seen from a viewpoint different from viewpoints of the input images is generated, then the process goes back to the main routine in FIG. 2.

Figure 7:
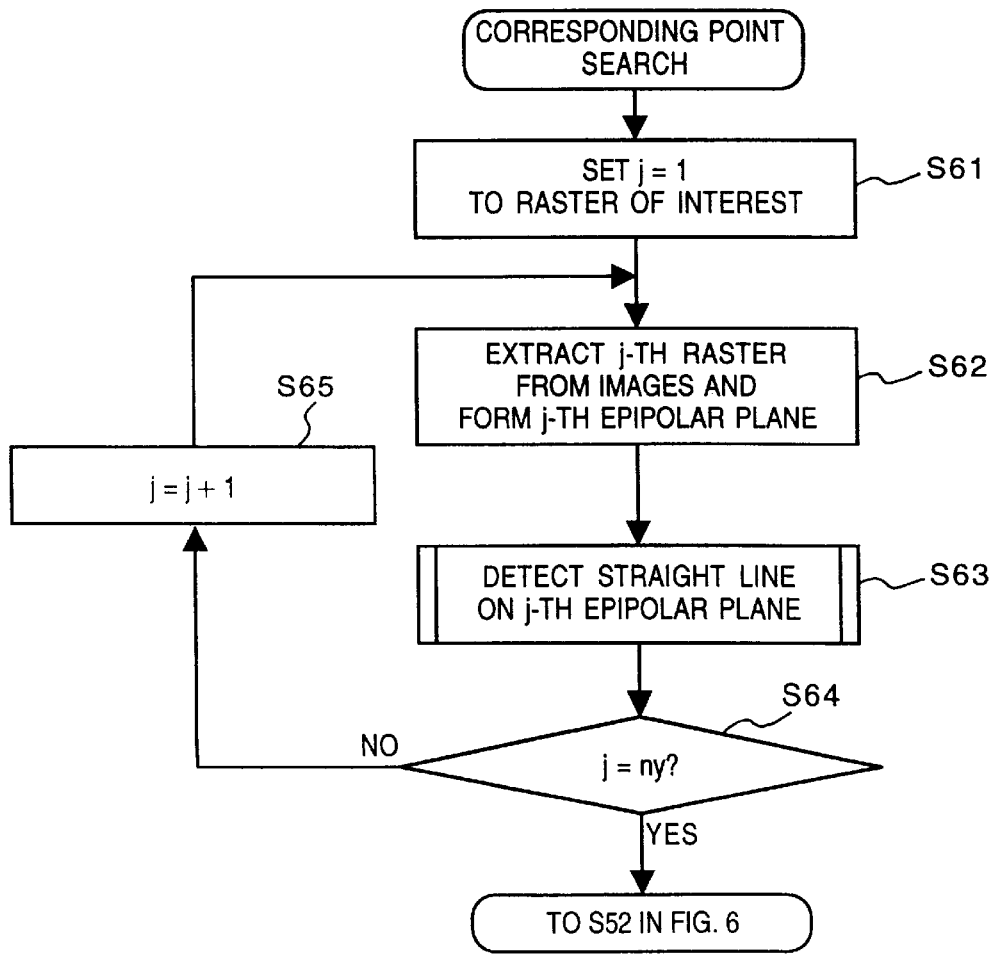
FIG. 7 is a flowchart showing an processing sequence of a corresponding point detecting process.
Figure 8:
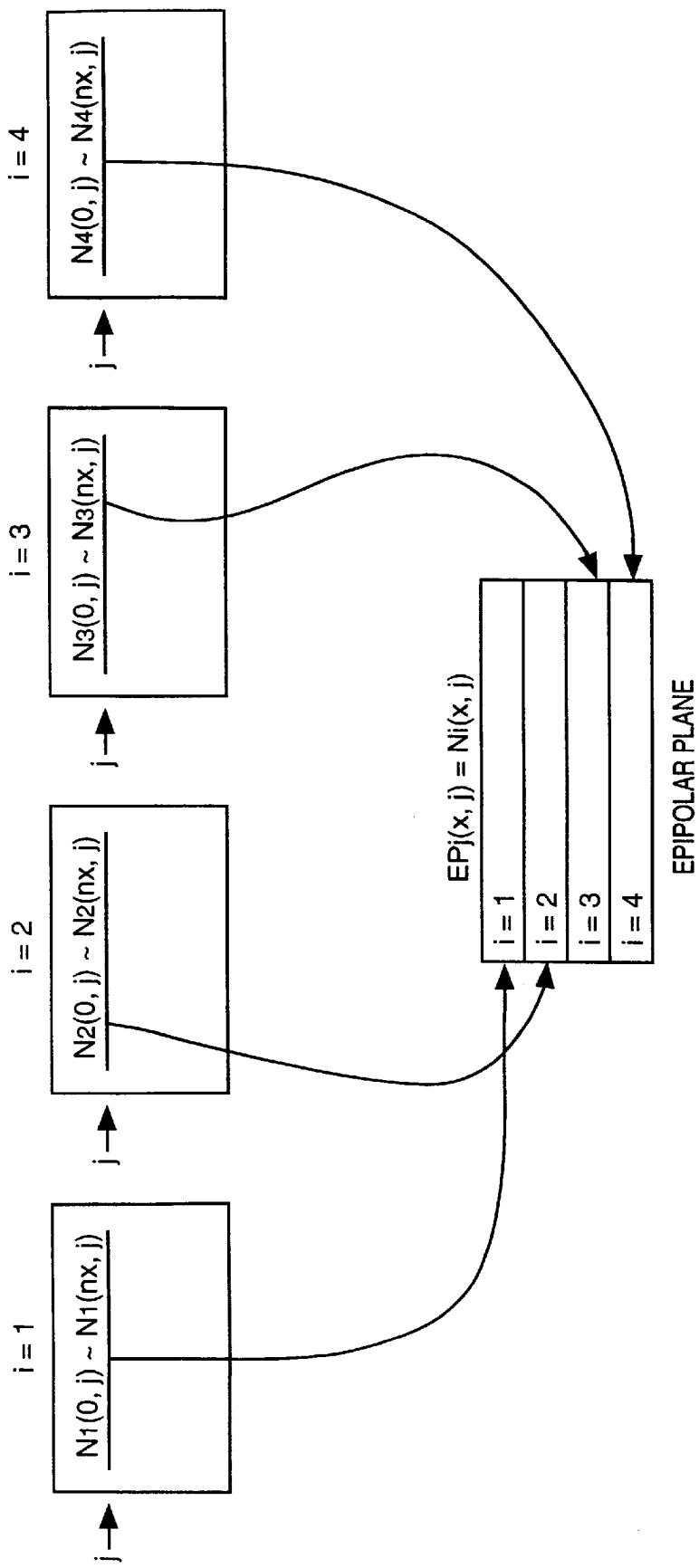
FIG. 8 is an explanatory view in which a j-th epipolar plane is formed from each image (i=1 to 4)

FIG. 7 is a flowchart showing an processing sequence of a corresponding point searching process at step S51. First at step S61, initialization is performed in order to extract the first raster of each image as a raster of interest. Next at step S62, the rasters of interest of each image are stored in a work memory, then a j-th epipolar plane (j-EPI) is virtually constructed. The j-th epipolar plane here is formed in such a manner that data of the j-th rasters are extracted from each image (i=1~4) and arranged, as shown in FIG. 8.

Figure 9:
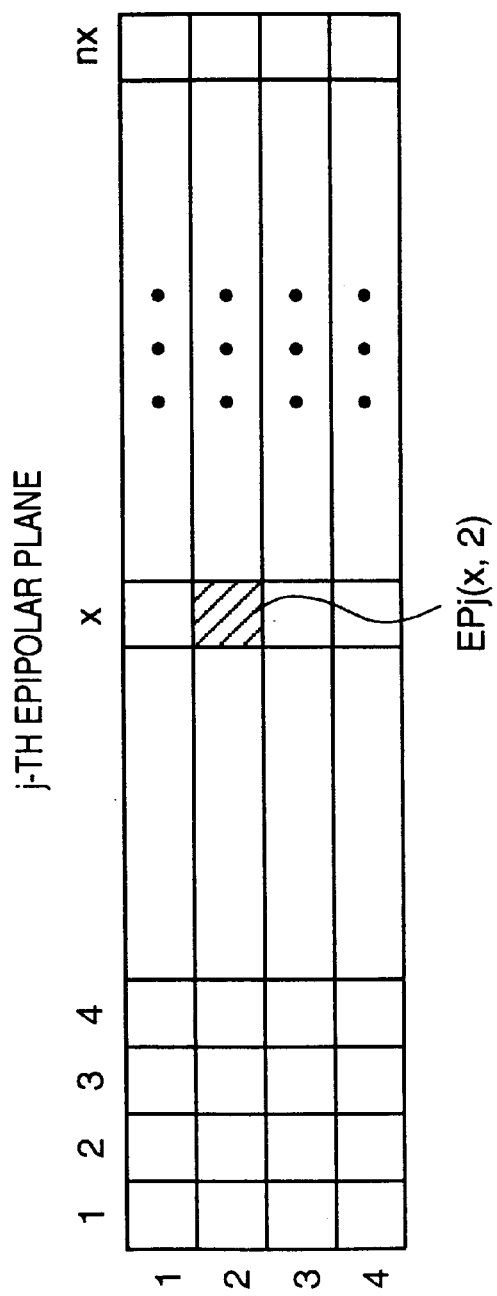
FIG. 9 is a diagram explaining construction of data in the j-th epipolar plane.

FIG. 9 is a diagram explaining construction of data in the j-th epipolar plane. The epipolar plane is composed of four epipolar lines obtained by extracting corresponding rasters from the four images.

The j-th epipolar plane is composed of a set of points, EPj(x, i), which satisfy following equation, EPj(x, i)=Ni(x, j) where Ni (x, j) denotes a x-th pixel value in j-th line of an i-th image (i=1~4), namely, a value of a pixel whose coordinates are (x, j) in the i-th image. For example, at EPj(x, 2) in FIG. 9, a value at (x, j) in the second image, namely N2(x, j) is stored.

In a case where image sensing surfaces of input devices (cameras) are arranged at an equal interval in parallel to each other, the corresponding points (same point in each image) form a straight line on the epipolar plane. Therefore, the corresponding points can be determined by determining this straight line, further, interpolation of images is to be performed on the determined straight line. Thus, at step S63, the straight line on which the corresponding points exist is determined on the j-th epipolar plane. Then the corresponding points are determined from the determined straight line and stored.

Figure 10:
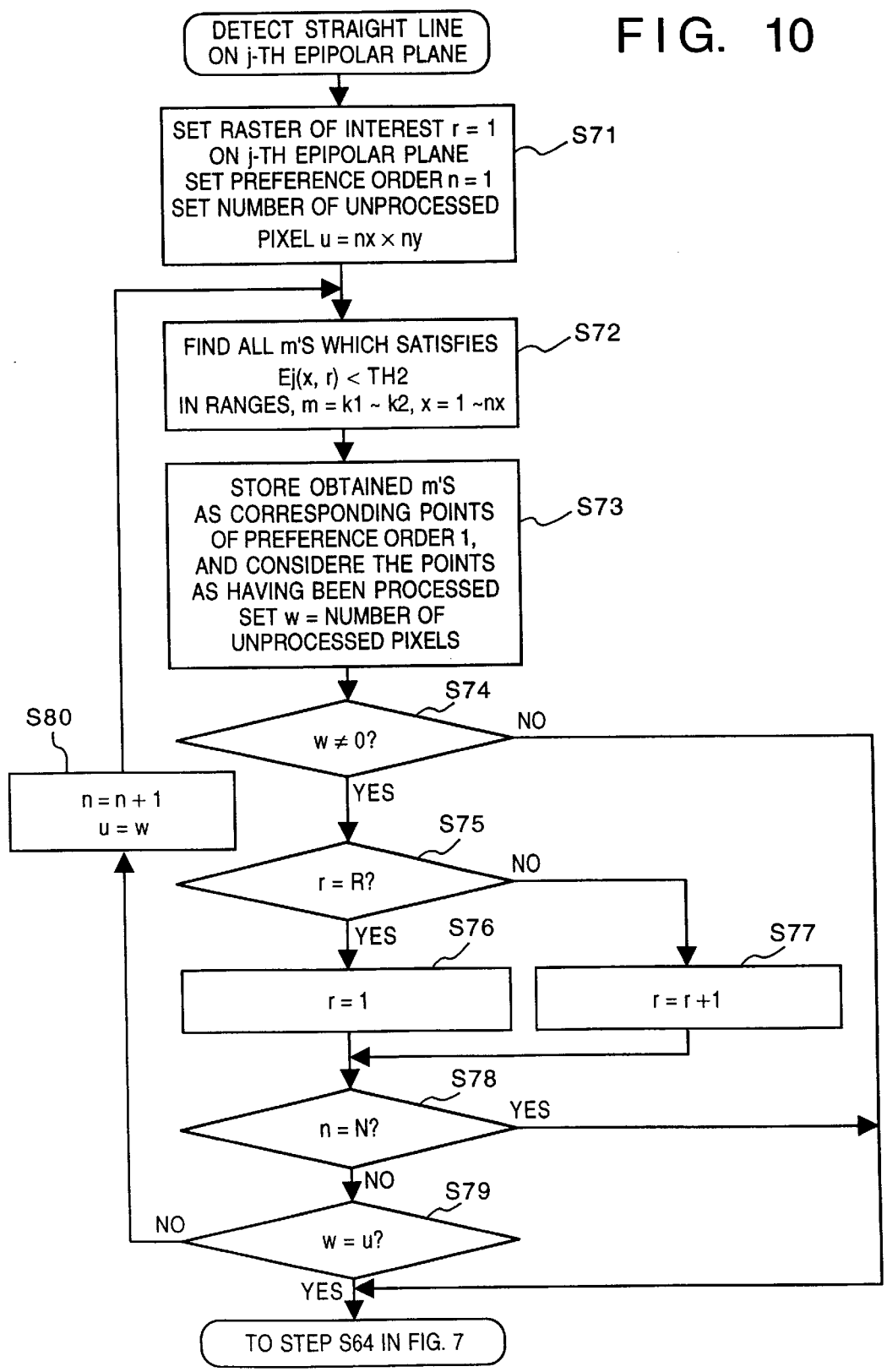
FIG. 10 is a flowchart showing an operational sequence of detecting a straight line at searching the corresponding points.

A method for determining the straight line for searching the corresponding points on the epipolar plane is next described. FIG. 10 is a flowchart showing an processing sequence for determining a straight line for searching corresponding points.

First at step S71, a preference order, n, is set to 1, and a raster of a pixel of interest, r, is set to 1. The preference order, n, shows relationship between objects overlaying in images. For example, the preference order n=1 represents an object in the image is in front (closer to the cameras), and will not be hidden behind other objects when a viewpoint is moved. Therefore, the corresponding points of the preference order 1 exist on all epipolar lines. Then, as the preference order decreases, namely the number of preference order, n, increases, there are more epipolar lines on which the corresponding points of the preference order do not exist.

The process moves to step S72, and EPj(x, r) is considered as a pixel of interest, and all m's which satisfy the following equation (6) are calculated in ranges, m=k1~k1+k2, x=1~nx.

$$E_j(x, r) = \sum_{i=r+1}^{N} \{EP_j(x + m \times (i - r), i) - EP_j(x, r)\}^2 < TH2 \quad (6)$$

The value, k1, is determined depending upon the input method, and when the cameras are arranged in parallel at equidistance from the object to pick up an image of an object, k1 is 1. The value, k2, is determined depending upon the distance between a camera and the object, and set to 20 (it is assumed that the viewpoint does not move more than 20 pixels) in this embodiment. Note, nx represents the number of pixels of an image in the main scanning direction.

Note that m can be a real number, thus a value of x+m×(i−r) has to be rounded to the nearest whole number to determine the corresponding x coordinate. TH2 in the equation (6) is a threshold for finding the corresponding points, and set to 1200 in this embodiment. The reason why it is set to 1200 is that the epipolar plane is composed of four rasters, thus differences are calculated three times. It is assumed that, if the difference is about less than 20, colors are almost the same, the number 1200 is obtained from 3×20 ×20.

If no specularity component exists in images inputted by an ideal input unit (corresponding points in each image have a same pixel value), TH2=0 is proper. However, in practice, pixel values of the corresponding points in each image differ, thus the difference is set to 20. Therefore, as more precise the input unit becomes, the difference becomes smaller. On the contrary, in an opposite case, the difference should be set large.

The aforesaid method is described when a process is performed on each RBG pixel value, however, it can also be applied to a case where the value is converted into YIQ, HSI, or other color system, and the threshold can be set so as to suit the color systems.

Further, when EPj(x+m×(i−r), i) does not exist (namely, x+m×(i−r) is outside of the range of the x axis (1~nx)), the process continues assuming that the point corresponding to m does not exist. However, if EPj(x+m×(i−r), i) has already been processed at step S72, the process continues assuming that EPj(x+m×(i−r), i)−EPj (x,r) is 0.

Then the process proceeds to step S73 where the corresponding points of the preference order n are determined from the straight line of slope m obtained at step S72, and stored. When a plurality of corresponding points are found, all of such points are stored as corresponding points to the preference order n, for convenience. The pixels which are determined as corresponding points are considered to have been processed. It should be noted that, if a corresponding point overlaps another corresponding point of the same preference order, the point having the larger value of m (the one whose slope is gentler with respect to the epipolar lines) is preferred. This is because the movement of the point on images caused by the displacement of the viewpoint becomes greater as the object represented by the corresponding point is closer to the cameras (namely, the value of m becomes greater), thus the point having the larger value of m is preferred among a plurality of corresponding points of the same preference order.

In the process at step S73, when the corresponding points obtained from the straight line of slope m are processed (they are determined as corresponding points of higher preference order, and the corresponding points of a pixel currently interested is hidden behind the corresponding points of a higher preference order), the points are not considered as the corresponding points on the straight line of slope m. Then, number of unprocessed pixels, w, is set.

Then the process proceeds to step S74 where whether or not the number of unprocessed pixel is 0 is determined. If it is 0, the process is completed, and goes back to step S64 (FIG. 7). If it is not 0, the process moves to step S75 where it is determined whether or not the raster of interest, r, is the last raster, R. If the raster of interest, r, is the last raster, then the process proceeds to step S76, and the raster of interest, r, is set to 1 (first raster). On the other hand, if the raster of interest is not the last raster, then the process moves to step S77 where the value of the raster is incremented by 1. Note that R at step S75 indicates the number of rasters (R=4, in this embodiment) consisting the epipolar plane.

Next, the process proceeds to step S78, and whether or not n, indicating the preference order, is equal to N is determined. N indicates the complexity of the phenomenon in which objects hide other objects (occlusion). More specifically, if the value of N is large, a large number of objects are overlapped, whereas if the value of N is small, a small number of objects are overlapped. The number of N is set depending upoh how in detail occlusion is expressed. Here, N is set to (R−1)×10, namely 30, as an empiric value.

If it is determined that n is not equal to N at step S78, the process proceeds to step S79. Whereas, if it is determined that n=N at step S78, the process is completed. At step S79, it is determined whether or not the number of unprocessed pixels, w, decreased comparing to the number of unprocessed pixel, u, in the former process. If the number of unprocessed pixels decreased, the process proceeds to step S80. At step S80, value of n in incremented by 1, and u is updated to the value of w, then the process goes back to step S72. On the other hand, if the number of unprocessed pixel did not decrease, then the process to detect a straight line on the j-th epipolar plane (j-EPT) is completed, and the process goes back to step S64 (FIG. 7).

By performing the process in accordance with the aforesaid algorithm, corresponding points which are not found from two images can be determined. Further, the process deals with occlusion, and the like, thus the precision of searching corresponding points increases.

At step S64 in FIG. 7, it is determined whether or not all rasters of input images are processed. If there is any unprocessed raster, the process moves to step S65 where value of j is incremented by 1, then the process goes back to step S62. Whereas, if it is determined that all rasters are processed, the corresponding point searching process is completed, and the process goes back to the flowchart in FIG. 6. Note, ny at step S64 is the total number of rasters of the input images.

Next, the process at step S52 in FIG. 6, namely an image interpolation process, will be described. The image interpolation process is performed by using the corresponding points obtained at step S51. The processing sequence is described with reference to FIGS. 11 to 14.

FIG. 11 shows a j-th epipolar plane from which the aforesaid corresponding points are determined. In FIG. 11, a1 and c1 represent corresponding points of the preference order 1, and b2 represents corresponding points of the preference order 2. A case where p images are interpolated between the input images at an equal interval will be described below. Note that, in this embodiment, p is chosen to be 2 in order to simplify the explanation.

Figure 12:
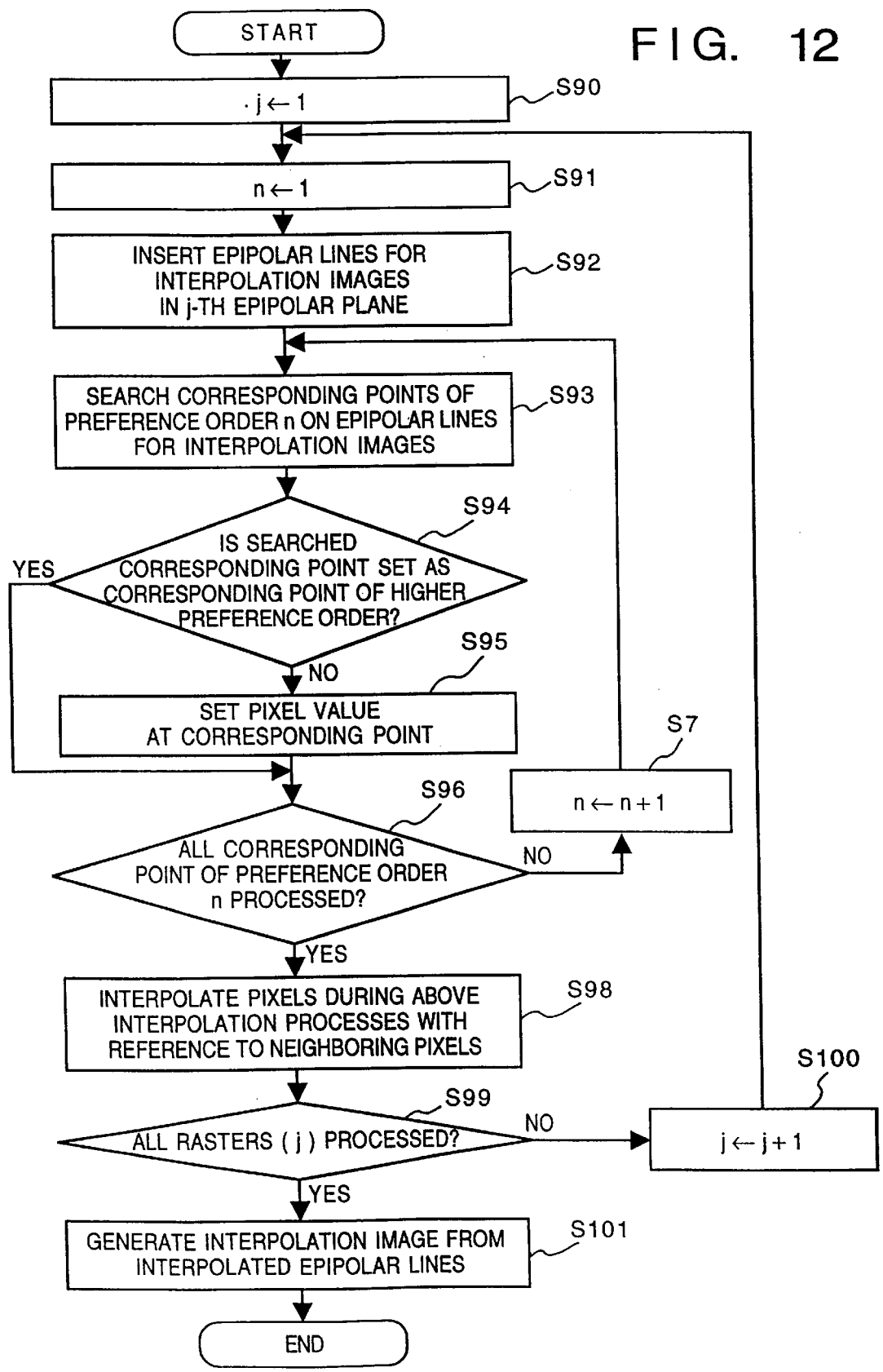
FIG. 12 is a flowchart showing a processing sequence of an interpolation process of an image.

FIG. 12 is a flowchart showing an processing sequence of the image interpolation process. At step S90, a number of epipolar plane to be processed, j, is set to 1. Then at step S91, the preference order, n, is set to 1. At step S92, epipolar lines for interpolation images are inserted in the j-th epipolar plane.

Figure 13:
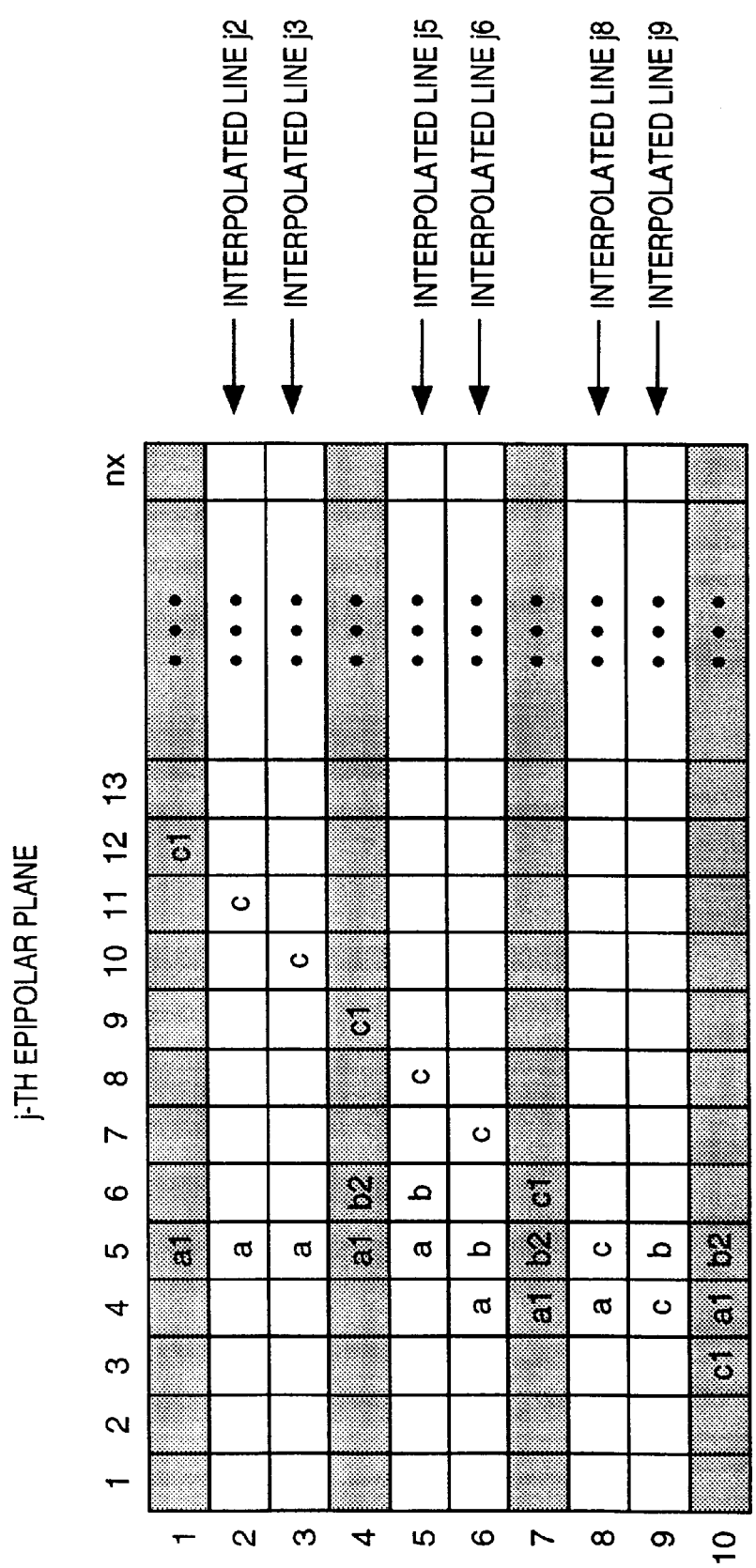
FIG. 13 shows an epipolar plane when two images are generated between original images by interpolation.

FIG. 13 shows an epipolar plane when two images are generated by interpolation between original images. Two epipolar lines are inserted between neighboring two epipolar lines on the j-th epipolar plane shown in FIG. 11.

Next at step S93, the corresponding points on the epipolar plane of the interpolation images are searched. Here, pixels on the straight line connecting the corresponding points on the epipolar plane of the input images are extracted as corresponding points. At step S94, whether or not a pixel assured as the corresponding point has been set as a corresponding point of the higher preference order is determined. If the pixel has not been set as the corresponding point of the higher preference order, the process proceeds to step S95, then a pixel value is set at the pixel as the corresponding point. The pixel value to be set at the corresponding point is an average of pixel values of corresponding points of the input images.

The order of straight lines, obtained by connecting the corresponding points of the input images, to be used is the increasing order of the slope m when the preference order is same. Then, if the corresponding points indicate the same pixel, the value of the pixel is updated. Thereby, the corresponding points in a line having larger slope, m, is preferred. This is because the movement of the point on the images caused by the displacement of the viewpoint is greater when the object represented by the corresponding point is closer to the cameras (namely, the value of m is greater). Therefore, the points on the line having the larger value of m is preferred among a plurality of corresponding points of the same preference order, and thus occlusion can be dealt with.

At step S95, values of pixels on the interpolated epipolar line and on the straight line which connects the corresponding points, as described above, are set to the average of values of pixels on the straight line connecting corresponding points on the originals. When the corresponding points a1 and c1 in FIG. 13 are considered, the pixel values of points a and c on the straight line connecting the corresponding points are the average value of pixels represented by a1 and c1, respectively.

Further, at a pixel (4, 9) in FIG. 13, a is set first, however, it is overwritten by the corresponding point c on the line having larger slope of m later.

When the aforesaid processes are performed on all the corresponding points having the preference order 1, n is incremented by 1, and corresponding points having the preference order 2 start to be processed (steps S96 to S97). The processes to be applied to the corresponding points of the preference order 2 are the same as those performed at aforesaid steps S93 to S97. However, there are some pixels which have already interpolated when the corresponding points of the preference order 1 are processed, thus those interpolated pixels are not processed at step S94.

This will be explained with reference to FIG. 13. A pixel (5, 8) is at the position which is to be interpolated with regard to corresponding points b2, however, it is already interpolated when the corresponding points c1 of the preference order 1 is processed, thus the pixel (5, 8) is not processed. Further, since the corresponding points b2 do not exist on the first raster of the epipolar plane of the original (see FIG. 11), neither does it exist at the corresponding points b2 on the first to third epipolar lines in FIG. 13. Furthermore, in the example of FIG. 13, occlusion occur at the points (4, 9) and (5, 8), and it is dealt with by the process described above.

When the corresponding points having the preference order 2 are completely processed, it starts processing corresponding points of the preference order 3. The aforesaid processes are repeated until all the corresponding points of the last preference order are processed.

After the corresponding points of the last preference order have been processed, the process proceeds from step S96 to step S98 where pixels which are not interpolated during the above-said processes are interpolated with reference to neighboring pixels. As for the interpolation at this time, there are methods of using an average value of neighboring pixels and of using a value of the pixel closest to the pixel to be interpolated.

Figure 14:
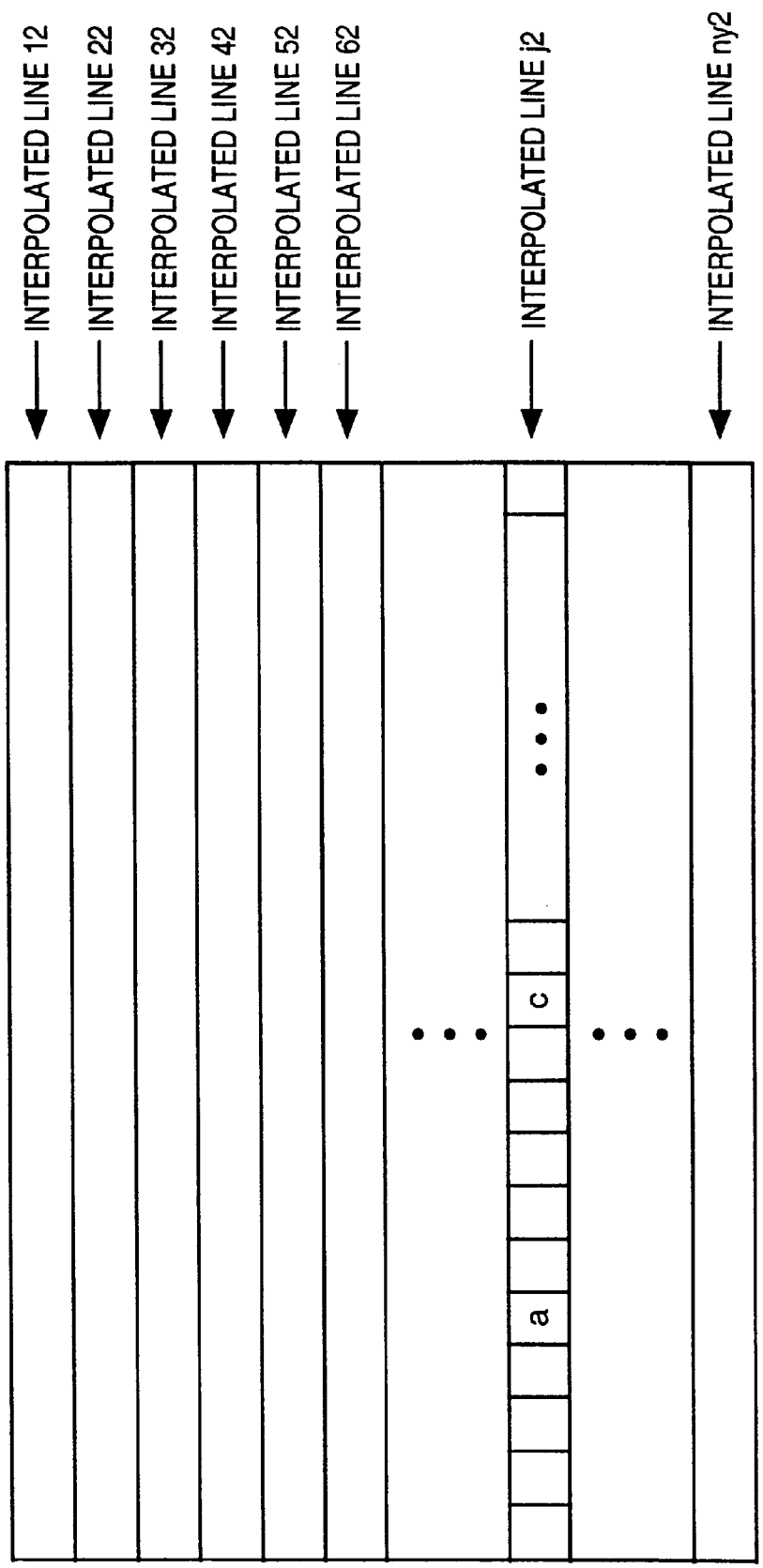
FIG. 14 is an explanatory view of forming interpolation images from epipolar lines.

At step S99 and S100, the aforesaid processes of steps S91 to S99 are performed on epipolar planes of j=1~ny. Accordingly, when the processes are performed on all the epipolar planes of j, the epipolar lines of j2, j3, j5, j6, j8, and j9 are generated by interpolation as shown in FIG. 13. In this embodiment, six interpolation images are obtained. Then at step S101, an interpolation image is generated from the interpolated epipolar lines generated as above. For example, a n interpolation image 2 in FIG. 14 is generated by arranging the interpolated epipolar lines j2 (j=1~ny). Interpolation images 3, 5, 6, 8, and 9 can be generated in the same manner.

By generating interpolation images from a plurality of input images by using the aforesaid configuration and method, corresponding points which could not be detected from two input images can be obtained, thus improving quality of interpolation. Further, corresponding points are found by using a plurality of input images, thus solving the occlusion problem, as described above.

It should be noted that explanation about parallax in the vertical direction is omitted in the above embodiment, however, an image considering parallax in the vertical direction can be generated in such a manner that multi-viewpoint images picked up from image-taking viewpoints arranged at intersections of large meshes on a plane are stored and images are interpolated between the multi-viewpoint images in the right and left direction, then in the vertical direction. Here, interpolation images in the vertical direction can be generated by extracting a straight line formed by pixels arranged in the vertical direction and constructing an epipolar plane.

Further, there are inputted images picked up by a plurality of cameras from different viewpoints, however, the input images can be picked up by a single camera by sliding its position so as to obtain equivalent images picked up by a plurality of cameras set at fixed positions. In this case, the direction of sliding of the camera and the x direction (main scanning direction) of the image sensing surface of the camera has to be parallel, or corresponding points will not form a straight line on an epipolar plane. However, the calibration described in the above embodiment can be applied to this case, too. Thus, it is apparent that it is possible to arrange corresponding points on a straight line.

In a case where a plurality of images are taken by sliding the position of a single camera, first, images of objects are picked up at two positions. Then, a straight line connecting origins of camera coordinate systems at the two positions is defined as x axis of a reference projection plane, and y axis of an arbitrary camera coordinate system is defined as y axis of the reference projection plane. Since it is possible to find relationship between coordinate system of this reference projection plane and the world coordinate system, the relationship can be denoted as reference parameter matrix Tb. By using the thus obtained reference parameter matrix Tb, an interpolation image can be obtained from the equation (5), similarly to the above embodiment.

Furthermore, in the above embodiment, one of the cameras is defined as the reference camera, and the reference projection plane is defined by the image sensing surface of the reference camera, however, the present invention is not limited to this. An arbitrary plane can be defined as the reference projection plane. In such a case, by obtaining the reference parameters by finding relationship between the world coordinate system and the coordinate system of the arbitrary plane, calibration can be performed in the same manner as in the aforesaid embodiment. Note, since the equation of the reference projection plane in the world coordinate system is known, the relationship should be easily obtained.

Further, in the above embodiment, a rectangular area is extracted from the reference projection plane before the image interpolation processes, and the method for extracting the rectangular area is not limited to this. For example, it can be extracted by obtaining pixel values of one line necessary to generate an epipolar plane and projecting on the reference projection plane. More specifically, in the above embodiment, the j-th epipolar plane is constructed by extracting j-th rasters of images projected on the reference projection plane. Instead, pixel values of coordinate points corresponding to only j-th rasters projected on the reference plane can be obtained, then constructing the j-th epipolar plane. For example, if y component of each pixel on the j-th raster is yj, then the j-th epipolar plane can be formed by using values of pixels expressed by (xm', yj).

According to the embodiment as described above, the input images on image sensing surfaces can be corrected to images on a single plane, thus search of corresponding points at the image interpolation process can be performed by finding a straight line on an epipolar plane. Accordingly, it becomes easier to search corresponding points, thereby to generate interpolation images.

The present invention can be applied to a system constituted by a plurality of devices, or to an apparatus comprising a single device. Furthermore, the invention is applicable also to a case where the object of the invention is attained by supplying a program to a system or apparatus.

According to the present invention as described above, images picked up by a plurality of cameras can be corrected and projected on a single plane.

Further, according to another configuration of the present invention, it is possible to extract and output a desired image from images projected on the single plane.

Furthermore, according to another configuration of the present invention, it is possible to extract a part of images projected on the single plane so that optical axes of the plurality of cameras picking up images are considered to be parallel to each other.

Further, according to the present invention, an epipolar plane is formed from a plurality of images corrected to be images on the single plane, thereby corresponding points can be detected as a straight line. Accordingly, it becomes very easy to detect the corresponding points.

Further, according to the present invention, new lines are generated by interpolation in an epipolar plane on the basis of the arrangement of the corresponding points detected on the epipolar plane, and a new image is generated by using the generated lines. Accordingly, it is possible to generate images seen from different viewpoints from those of the input images.

Further, according to the present invention, occurrence of occlusion is detected from the arrangement of the detected corresponding points on an epipolar plane, thus more accurate interpolation images can be generated.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting a plurality of images on a plurality of image planes;

setting means for setting one reference plane;

calculation means for calculating conversion parameters representing a relationship between pixel positions on the plurality of image planes and on the reference plane when the plurality of images inputted by said input means are projected on the reference plane;

converting means for converting the plurality of images on the plurality of image planes into a plurality of images on the reference plane based on the conversion parameters calculated by said calculation means;

extraction means for extracting partial images from respective images on the reference plane formed by the result of conversion of the plurality of images on the plurality of image planes; and image forming means for forming an image of a desired view position based on the partial image extracted by said extraction means.

2. The image processing apparatus according to claim 1, wherein said calculation means calculates the conversion parameters representing correspondence between a coordinate system of each of the image planes of a camera and a coordinate system of the reference plane on the basis of a reference parameter representing correspondence between a coordinate system of an object calculated in accordance with an image taking result of the object and the coordinate system of the reference plane, and a camera parameter representing correspondence between the coordinate system of the object and the coordinate system of the image planes of the camera.

3. The image processing apparatus according to claim 2, wherein the reference plane is a desired plane represented by the coordinate system of the object.

4. The image processing apparatus according to claim 2, wherein the reference plane is a plane including an image plane of a reference camera arranged at a desired image-taking position, further comprising reference parameter obtaining means for calculating the reference parameter representing correspondence between the coordinate system of the image plane of the reference camera and the coordinate system of the object on the basis of the image-taking result of the object by the reference camera before the calculation by said calculation means.

5. The image processing apparatus according to claim 1, wherein the partial images extracted from the reference plane by said extraction means are images of areas whose centers are an intersection of a perpendicular from a center of a lens on the reference plane.

6. The image processing apparatus according to claim 1, wherein the partial images extracted by said extraction means are epipolar lines forming an epipolar plane.

7. The image processing apparatus according to claim 6, wherein said image forming means comprises:

epipolar plane forming means for forming an epipolar plane based on the epipolar lines extracted by said extraction means;

determination means for determining a straight line indicating an arrangement of corresponding points on the epipolar plane formed by said epipolar forming means;

epipolar line generating means for generating an epipolar line to be inserted between a pair of the epipolar lines of the epipolar plane by locating corresponding points in the epipolar line to be inserted based on straight lines determined by said determination means; and image generating means for generating an image of a desired view position based on the inserted epipolar lines generated by said epipolar line generating means.

8. The image processing apparatus according to claim 7, wherein said determination means determines a plurality of straight lines each of which indicates an arrangement of corresponding points, gives a higher priority to a straight line that is not interrupted by another straight line and gives a lower priority to a straight line that is interrupted by another straight line, and said epipolar line generating means determines pixel values of the inserted epipolar line by using the straight lines in descending order of priority.

9. The image processing apparatus according to claim 7, wherein said determination means, when a plurality of crossing straight lines are determined, gives the highest priority to the straight line whose slope is closest to a horizontal line.

10. An image processing method comprising:

an inputting step of inputting a plurality of images on a plurality of image planes;

a setting step of setting one reference plane;

a calculation step of calculating conversion parameters representing a relationship between pixel positions on the plurality of image planes and on the reference plane when the plurality of images inputted at said input step are projected on the reference plane;

a converting step of converting the plurality of images on the plurality of image planes into a plurality of images on the reference plane based on the conversion parameters calculated at said calculation step;

an extraction step of extracting partial images from respective images on the reference plane formed by the conversion of the plurality of images on the plurality of image planes; and an image forming step of forming an image of a desired view position based on the partial images extracted at said extraction step.

11. The image processing method according to claim 10, wherein at said calculation step, the conversion parameters representing correspondence between a coordinate system of each of the image planes of a camera and a coordinate system of the reference plane on the basis of a reference parameter representing correspondence between a coordinate system of an object calculated in accordance with an image taking result of the object and the coordinate system of the reference plane, and a camera parameter representing correspondence between the coordinate system of the object and the coordinate system of the image plane of the camera.

12. The image processing method according to claim 11, wherein the reference plane is a desired plane represented by the coordinate system of the object.

13. The image processing method according to claim 11, wherein the reference plane is a plane including an image plane of a reference camera arranged at a desired image-taking position, further comprising a reference parameter obtaining step of calculating the reference parameter representing correspondence between the coordinate system of the image plane of the reference camera and the coordinate system of the object on the basis of the image-taking result of the object by the reference camera before the calculation at said calculation step.

14. The image processing method according to claim 10, wherein the partial images extracted from the reference plane at said extraction step are images of areas whose centers are an intersection of a perpendicular from a center of a lens on the reference plane.

15. The image processing method according to claim 10, wherein the partial images extracted at said extraction step are epipolar lines forming an epipolar plane.

16. The image processing apparatus according to claim 1, wherein said input means inputs the plurality of images on the plurality of image planes by using a plurality of cameras.

17. The image processing apparatus according to claim 1, wherein said input means inputs the plurality of images on the plurality of image planes by taking images while changing a position of a camera.

18. The image processing method according to claim 15, wherein said image forming step comprises:

- an epipolar plane forming step of forming an epipolar plane based on the epipolar lines extracted at said extraction step;
- a determination step of determining a straight line indicating an arrangement of corresponding points on the epipolar plane formed at said epipolar forming step;
- an epipolar line generating step of generating an epipolar line to be inserted between a pair of the epipolar lines of the epipolar plane by locating corresponding points in the epipolar line to be inserted based on straight lines determined at said determination step; and
- an image generating step of generating an image of a desired view position based on the inserted epipolar lines generated at said epipolar line generating step.

19. The image processing method according to claim 18, wherein in said determination step, a plurality of straight lines each of which indicates an arrangement of corresponding points are determined, a higher priority is given to a straight line that is not interrupted by another straight line and a lower priority is given to a straight line that is interrupted by another straight line, and in said epipolar line generating step, pixel values of the inserted epipolar line are determined by using the straight lines in descending order of priority.

20. The image processing method according to claim 18, wherein in said determination step, when a plurality of crossing straight lines are determined, the highest priority is given to the straight line whose slope is closest to a horizontal line.

21. The image processing method according to claim 10, wherein the plurality of images on the plurality of image planes are input by using a plurality of cameras in said input step.

22. The image processing method according to claim 10, wherein the plurality of images on the plurality of image planes are input by taking images while changing a position of a camera.

23. A computer program product comprising a computer readable medium having program codes for executing image processing, said product including:

- input process procedure codes for inputting a plurality of images on a plurality of image planes;
- setting process procedure codes for setting one reference plane;
- calculation process procedure codes for calculating conversion parameters representing a relationship between pixel positions on the plurality of image planes and on the reference plane when the plurality of images inputted by execution of said input process procedure codes are projected on the reference plane;
- converting process procedure codes for converting the plurality of images on the plurality of image planes into a plurality of images on the reference plane based on the conversion parameters calculated by execution of said calculation process procedure codes;
- extraction process procedure codes for extracting partial images from respective images on the reference plane formed by execution of said converting process procedure codes; and
- image forming process procedure codes for forming an image of a desired view position based on the partial images extracted by execution of said extraction process procedure codes.

* * * * *

UNITED STATES PATENT AND TRADEMARK OFFICE
CERTIFICATE OF CORRECTION

PATENT NO. : 5,937,105
DATED : August 10, 1999
INVENTOR(S) : Akihiro Katayama, et al.

It is certified that error appears in the above-identified patent and that said Letters Patent is hereby corrected as shown below:

ON THE TITLE PAGE:

References Cited [56]

OTHER PUBLICATIONS

"viewpoint" should read --Viewpoint--.
     "Soceity" should read --Society--.

ABSTRACT [57]

"intersects" should read --intersect--.

COLUMN 1

Line 19, "a" (second occurrence) should read --an--.
     Line 20, "a" (second occurrence) should read --an--.
     Line 58, "it." should read --them.--.

COLUMN 2

Line 53, "camera." should read --cameras.--.

UNITED STATES PATENT AND TRADEMARK OFFICE
CERTIFICATE OF CORRECTION

PATENT NO. : 5,937,105
DATED : August 10, 1999
INVENTOR(S) : AKIHIRO KATAYAMA, ET AL.

It is certified that error appears in the above-identified patent and that said Letters Patent is hereby corrected as shown below:

COLUMN 3

Line 23, "generate" should read --generating--.

COLUMN 4

Line 54, "generated is." should read --generated.--.

COLUMN 5

Line 4, "convert" should read --converting--.
Line 31, "a" should be deleted.

COLUMN 6

Line 10, "a" should read --an--.
Line 59, "an follow." should read --and following.--.
Line 63, "and" should be deleted.

UNITED STATES PATENT AND TRADEMARK OFFICE
CERTIFICATE OF CORRECTION

PATENT NO. : 5,937,105
DATED : August 10, 1999
INVENTOR(S) : AKIHIRO KATAYAMA, ET AL.

It is certified that error appears in the above-identified patent and that said Letters Patent is hereby corrected as shown below:

COLUMN 7

Line 11, "is" should read --are--.
Line 13, "is" should read --are--.

COLUMN 8

Line 4, "forms" should read --form--.
Line 9, "matches" should read --match--.

COLUMN 9

Line 4, "an" should read --a--.
Line 45, "in" (first occurrence) should read --in which--.

COLUMN 10

Line 16, "as" should read --the--.
Line 17, "the difference becomes smaller." should read --the smaller the difference becomes.--.
Line 54, "is" should read --are--.

UNITED STATES PATENT AND TRADEMARK OFFICE
CERTIFICATE OF CORRECTION

PATENT NO. : 5,937,105
DATED : August 10, 1999
INVENTOR(S) : AKIHIRO KATAYAMA, ET AL.

It is certified that error appears in the above-identified patent and that said Letters Patent is hereby corrected as shown below:

COLUMN 11

Line 2, "consisting" should read --corresponding to--.
    Line 10, "upoh" should read --upon--.
    Line 17, "pixel," should read --pixels,--.
    Line 19, "in" should read --is--.
    Line 21, "pixel" should read --pixels--.
    Line 52, "an" should read --a--.

COLUMN 12

Line 11, "same." should read --the same.--.
    Line 12, "is" should read --are--.
    Line 17, "is" should read --are--.
    Line 47, "is" should read --are--.
    Line 50, "does it" should read --do they--.
    Line 52, "occur" should read --occurs--.

UNITED STATES PATENT AND TRADEMARK OFFICE
CERTIFICATE OF CORRECTION

PATENT NO. : 5,937,105
DATED : August 10, 1999
INVENTOR(S) : AKIHIRO KATAYAMA, ET AL.

It is certified that error appears in the above-identified patent and that said Letters Patent is hereby corrected as shown below:

COLUMN 13

Line 9, "a n" should read --an--.
   Line 61, "camera," should read --camera;--.

Signed and Sealed this

Nineteenth Day of September, 2000

Attest:

Q. TODD DICKINSON

Attesting Officer    Director of Patents and Trademarks